United States Patent
Shiba (10) Patent No.: US 10,648,874 B1
(45) Date of Patent: May 12, 2020

(54) ROTARY DEVICE

(71) Applicant: JTEKT CORPORATION, Osaka-shi, Osaka (JP)

(72) Inventor: Mahito Shiba, Yamatotakada (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 16/690,302

(22) Filed: Nov. 21, 2019

(30) Foreign Application Priority Data

Nov. 30, 2018 (JP) .................................. 2018-225231

(51) Int. Cl.
*G01L 1/20* (2006.01)
*G01D 5/245* (2006.01)

(52) U.S. Cl.
CPC ................ *G01L 1/20* (2013.01); *G01D 5/245* (2013.01)

(58) Field of Classification Search
CPC .................................. G01L 1/20; G01D 5/245
USPC ..................................................... 73/862.68
See application file for complete search history.

(56) References Cited

U.S. PATENT DOCUMENTS

| 2002/0039025 A1* | 4/2002 | Shiba | G01D 5/145 |
| | | | 324/318 |
| 2010/0064824 A1* | 3/2010 | Oguma | F16C 19/186 |
| | | | 73/862.541 |

FOREIGN PATENT DOCUMENTS

JP 2011-149517 A 8/2011

* cited by examiner

*Primary Examiner* — Jamel E Williams
(74) *Attorney, Agent, or Firm* — Oliff PLC (57) ABSTRACT

A rotary device includes a stationary member, a rotary member, a sensor device including a sensor rotor, a first sensor, and a second sensor, and a processing device. The first sensor is configured to output a waveform signal that is delayed in phase when the rotary member is displaced relative to the stationary member. The second sensor is configured to output a waveform signal that is advanced in phase when the rotary member is displaced relative to the stationary member. The processing device is configured to calculate a displacement of the sensor rotor based on a difference between a first rotation angle and a second rotation angle, to correct the calculated displacement, and to calculate a load acting on the rotary device from the corrected displacement.

5 Claims, 9 Drawing Sheets

ROTARY DEVICE

INCORPORATION BY REFERENCE

The disclosure of Japanese Patent Application No. 2018-225231 filed on Nov. 30, 2018 including the specification, drawings and abstract is incorporated herein by reference in its entirety.

BACKGROUND

1. Technical Field

The disclosure relates to a rotary device including a sensor.

2. Description of Related Art

There are techniques for detecting a load acting on a rotary member by using a sensor. For example, Japanese Unexamined Patent Application Publication No. 2011-149517 (JP 2011-149517 A) discloses a technique for detecting a load acting on a vehicle hub unit (a vehicle bearing device) by using a sensor. The hub unit includes an outer ring fixed with respect to a vehicle body, a hub shaft to which a wheel is attached, and rolling elements disposed between the outer ring and the hub shaft. According to JP 2011-149517 A, the sensor is attached to the outer ring. The sensor is a displacement sensor (a gap sensor) and a portion of the hub shaft is subjected to detection by the sensor.

For example, when a load from the wheel acts on the hub unit, the hub shaft is slightly displaced relative to the outer ring in the radial direction. This displacement changes the gap between the sensor and the portion of the hub shaft being subjected to detection, and accordingly the output signal of the sensor changes. The displacement of the hub shaft and the acting load are obtained by computational processing of the output signal of the sensor.

SUMMARY

In the manufacture and assembly of structural parts of the hub unit, unavoidable manufacturing errors occur. The errors cause a slight whirling motion (eccentric rotation) of the hub shaft, regardless of whether a load acts thereon. The whirling motion of the hub shaft appears as periodic fluctuations in the output signal of the sensor. The periodic fluctuations are unnecessary components of the output signal of the sensor. The amount of the whirling motion takes up a large proportion of the amount (i.e., the gap) being detected by the sensor. Therefore, the output signal of the sensor needs to be corrected in order to accurately calculate the displacement of the hub shaft and the acting load.

Figure 9:
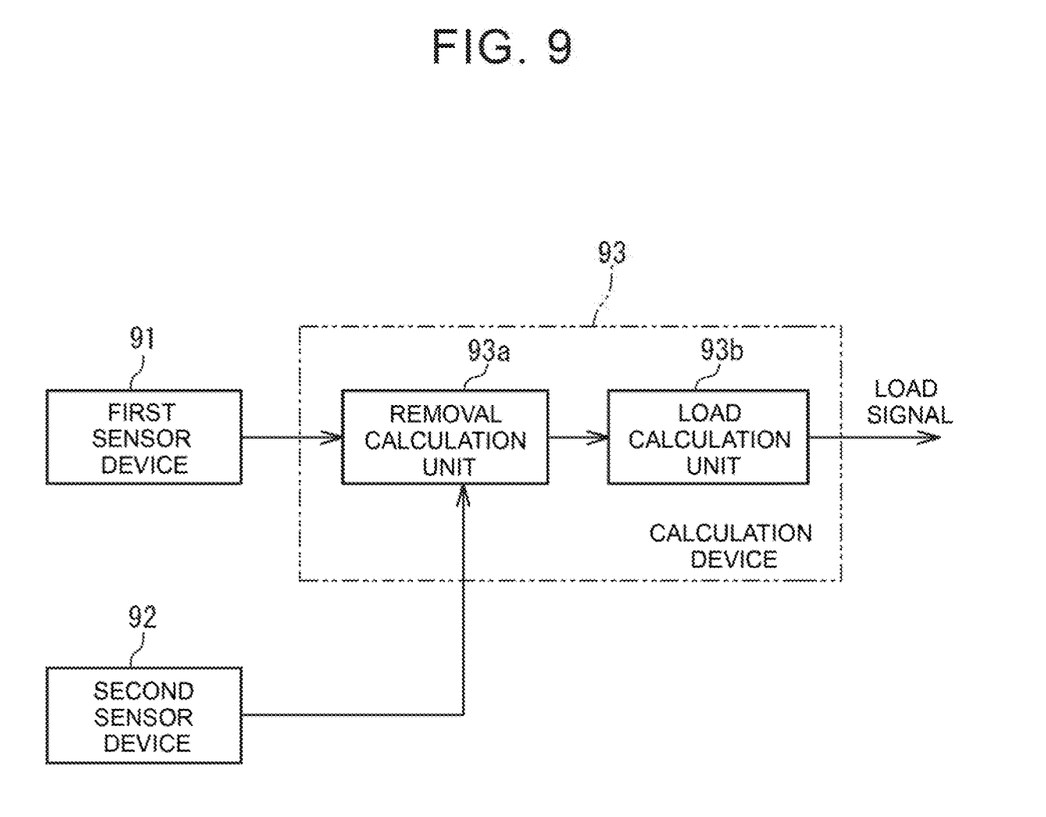
FIG. 9 is a diagram explaining a related art.

As illustrated in FIG. 9, in JP 2011-149517 A, a second sensor device 92 is used in addition to a first sensor device 91 that is a displacement sensor like the one described above, and a calculation device 93 for calculating a load from the output of the first sensor device 91. The second sensor device 92 is a rotary sensor. For example, the second sensor device 92 is an anti-lock braking system (ABS) sensor provided to the hub unit and outputs a pulse signal in accordance with rotation of the hub shaft. The calculation device 93 obtains, by calculation, the rotational angular velocity of the hub shaft from the pulse signal. The calculation device 93 (a removal calculation unit 93a) corrects, using the obtained rotational angular velocity, the output of the first sensor device 91 to reduce the unnecessary components. Then, the calculation device 93 (a load calculation unit 93b) calculates the load from the corrected output.

As described above, the related-art technique requires two separate sensors: the first sensor device 91 (a displacement sensor) used to calculate the displacement of the hub shaft and the acting load; and the second sensor device 92 (a rotary sensor) used for correction.

The disclosure provides a rotary device in which a sensor for detecting the displacement of a rotary member functions also as a rotary sensor.

An aspect of the disclosure relates to a rotary device that includes a stationary member, a rotary member, a sensor device, and a processing device. The rotary member is configured to rotate about a central axis of the stationary member. The sensor device includes a sensor rotor, a first sensor, and a second sensor. The sensor rotor is configured to rotate together with the rotary member. The first sensor and the second sensor are provided on the stationary member side, and the sensor rotor is subjected to detection by the first sensor and the second sensor. The processing device is configured to process signals output from the sensor device. Each of the first sensor and the second sensor of the sensor device is configured to output a periodic waveform signal a plurality of times while the rotary member makes one rotation together with the sensor rotor. The first sensor is configured to output a waveform signal that is delayed in phase when the rotary member is displaced relative to the stationary member. The second sensor is configured to output a waveform signal that is advanced in phase when the rotary member is displaced relative to the stationary member. The processing device is configured to calculate, based on the waveform signals, a first rotation angle of the sensor rotor at a first detection target position for the first sensor and a second rotation angle of the sensor rotor at a second detection target position for the second sensor. The processing device is configured to calculate a displacement of the sensor rotor based on a difference between the first rotation angle and the second rotation angle, to correct the calculated displacement, and to calculate a load acting on the rotary device from the corrected displacement.

According to the aspect, the rotation angle and displacement of the sensor rotor are both calculable based on the waveform signals output from the sensor device. Thus, the sensor device functions not only as a sensor for obtaining the displacement of the sensor rotor but also as a rotation sensor for obtaining the rotation angle of the sensor rotor. Since the sensor rotor rotates together with the rotary member, the rotation angle of the sensor rotor is equal to that of the rotary member, and the displacement of the sensor rotor is equal to that of the rotary member.

The displacement of the rotary member is in proportion to the rotation angle difference between the first and second rotation angles. Thus, the processing device calculates the displacement of the rotary member based on the rotation angle difference. Further, the load acting on the rotary device is calculable by multiplying the calculated displacement by a value (a coefficient) indicating the stiffness of the rotary device. Thus, in the rotary device, the calculated displacement is correctable based on the waveform signals from the sensor device, and the load acting on the rotary member is calculable from the corrected displacement.

According to the aspect, the rotary device may further includes a storage device configured to store correction data indicating a whirling amount of the rotary member during one rotation of the rotary member. The processing device may be configured to correct the calculated displacement by subtracting the whirling amount indicated by the correction data from the calculated displacement of the sensor rotor. This structure reduces the time required to correct the calculated displacement.

The rotation frequency of the sensor rotor corresponds to the whirling frequency of the rotary member. Using this relationship, according to the aspect, the processing device may be configured to calculate a rotation frequency of the sensor rotor based on the waveform signals output from the sensor device. The processing device may be configured to remove a frequency component of the rotation frequency from frequency domain data obtained by converting the waveform signals output from the sensor device into frequency domains, to reconvert the frequency domain data without the frequency component back to time domain data, and to calculate the displacement of the sensor rotor based on the time domain data obtained through the reconversion. This structure eliminates the need of prestoring the correction data.

According to the aspect, the processing device may be configured to convert the waveform signals from the first sensor and the second sensor respectively to a first angle signal and a second angle signal each having monotonicity for each period of the corresponding waveform signal. The processing device may be configured to calculate the first rotation angle and the second rotation angle of the sensor rotor respectively from the first angle signal and the second angle signal. This structure improves the accuracy of calculation of the rotation angle of the sensor rotor.

According to the aspect, each of the first sensor and the second sensor may be configured to output two waveform signals having a phase difference. This structure improves the accuracy of calculation of the rotation angle of the sensor rotor.

Thus, in the rotary device according to the aspect, the sensor device for detecting the displacement of the rotary member functions also as a rotary sensor. This leads to reduction in size and weight of the rotary device.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Regarding Structure of Rotary Device 10

Figure 1:
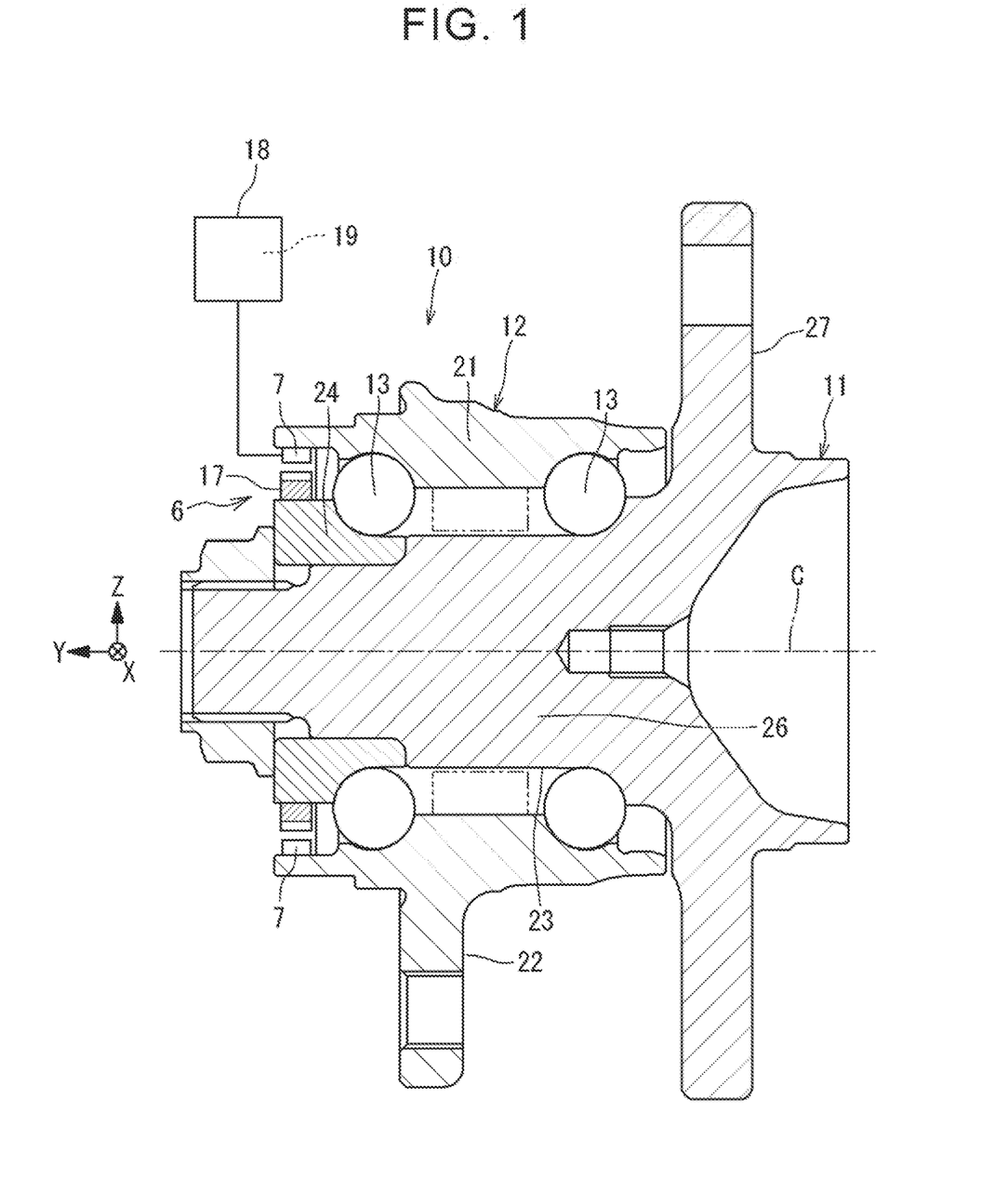
FIG. 1 is a schematic diagram illustrating a rotary device according to an embodiment.
Figure 2:
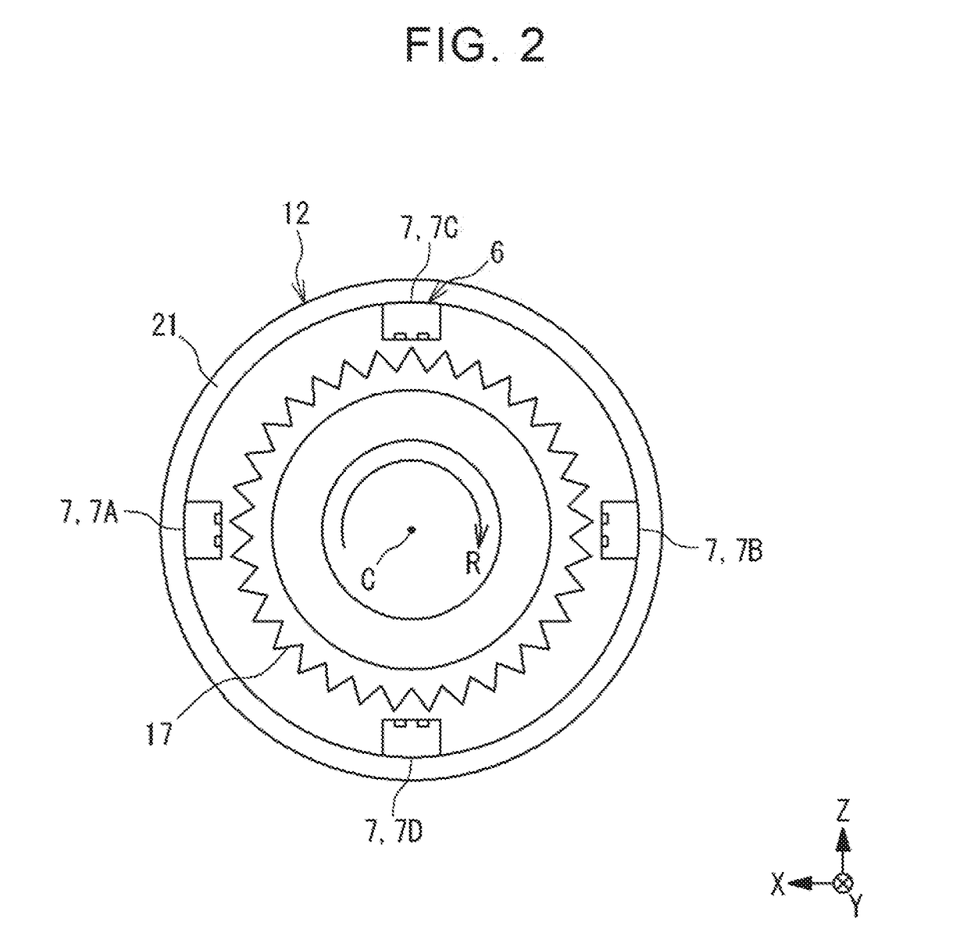
FIG. 2 is a simplified diagram of the rotary device viewed from an axial second side.

FIG. 1 is a cross-sectional view illustrating a rotary device 10 according to an embodiment. The rotary device 10 is a vehicle hub unit (a vehicle bearing device). The rotary device 10 includes a hub shaft 11 (an inner shaft member), a tubular outer ring 12 (an outer ring member) located radially outside the hub shaft 11 to surround part of the hub shaft 11, and balls 13 as rolling elements. The following are definitions of the terms used in the description of the rotary device 10. The term "axial direction" refers to directions along a central axis C of the outer ring 12. The axial direction includes directions parallel to the central axis C. The term "radial direction" refers to directions perpendicular to the central axis C. According to the embodiment, the hub shaft 11 rotates about the central axis C. The term "circumferential direction" refers to directions in which the hub shaft 11 rotates about the central axis C. The term "Y-axis direction" refers to directions along the central axis C. The term "X-axis direction" refers to horizontal directions perpendicular to the central axis C. The term "Z-axis direction" refers to vertical directions perpendicular to the central axis C. In FIGS. 1 and 2, X, Y, and Z axes form an orthogonal coordinate system. With the rotary device 10, which is a hub unit, fixed with respect to a body of a vehicle, when a steering angle of the vehicle is zero, the longitudinal direction of the vehicle coincides with the X-axis direction, the lateral direction of the vehicle coincides with the Y-axis direction, and the vertical direction of the vehicle coincides with the Z-axis direction.

The outer ring 12 includes the following: an outer-ring body portion 21 having a cylindrical shape; and a mounting flange portion 22 extending radially outward from the outer-ring body portion 21. The outer ring 12 is mounted by the flange portion 22 to a knuckle (not illustrated) of the vehicle body. Thus, the rotary device 10 including the outer ring 12 is fixed to the vehicle body. According to the embodiment, the outer ring 12 is a stationary member, and the hub shaft 11 is a rotary member. The hub shaft 11 rotates relative to the outer ring 12 about the central axis C.

The hub shaft 11 includes an inner shaft 23 and an inner ring 24 attached near one end of the inner shaft 23 in the axial direction. The inner shaft 23 includes the following: an inner-shaft body portion 26 located radially inward of the outer ring 12; and a flange portion 27 provided near one end of the inner-shaft body portion 26 in the axial direction (hereinafter referred to as a "axial first end"). The flange portion 27 extends radially outward from near the axial first end of the inner-shaft body portion 26. Although not illustrated in the drawings, a wheel and a brake rotor are attached to a surface of the flange portion 27 on the axial first end side.

The inner ring 24 is an annular member and is attached on near the other end of the inner-shaft body portion 26 in the axial direction (hereinafter referred to as a "axial second end") in a manner that does not allow the inner ring 24 to come off from the inner-shaft body portion 26 in the axial direction. The outer-ring body portion 21 has an inner circumference provided with an outer raceway with which the balls 13 are in rolling contact. Each of the inner-shaft body portion 26 and the inner ring 24 has an outer circumference provided with an inner raceway with which the balls 13 are in rolling contact. The balls 13 are arranged in two rows between the outer ring 12 and the hub shaft 11. The balls 13 in each row are retained by a cage (not illustrated).

The rotary device 10 further includes the following: a sensor device 6; a processing device 18 configured to process output signals of the sensor device 6; and a storage device 19. The sensor device 6 includes a plurality of sensors 7 and a sensor rotor 17 that rotates together with the hub shaft 11. The sensor rotor 17 is attached on the axial second side of the hub shaft 11 about the central axis C. In the example of FIG. 1, the sensor rotor 17 fits on part of the inner ring 24 and is thus fixed in position. The sensor rotor 17 is an annular member and has a gear shape. Specifically, as illustrated in FIG. 2, the sensor rotor 17 has a plurality of teeth that are (equally) spaced from each other in the circumferential direction. FIG. 2 is a simplified diagram of the rotary device 10 viewed from the axial second end. The teeth of the sensor rotor 17 are subjected to detection by the sensors 7. The sensor rotor 17 preferably be made of a ferromagnetic material.

As described above, the sensor device 6 includes the sensors 7. The sensors 7 are located around the sensor rotor 17 and the sensor rotor 17 is (specifically, the teeth of the sensor rotor 17 are) subjected to detection by the sensors 7. According to the embodiment, four sensors 7 are equally spaced in the circumferential direction. The four sensors 7 includes a first sensor 7A, a second sensor 7B, a third sensor 7C, and a fourth sensor 7D. In the example of FIG. 2, the first sensors 7A, 7B, 7C, and 7D are respectively located in front of, behind, above, and below the central axis C. The first to fourth sensors 7A, 7B, 7C, and 7D have the same structure and are therefore collectively referred to simply as the sensors 7 when describing their common features. The first and second sensors 7A and 7B are spaced from each other by an angular distance of 180 degrees around the central axis C. The first and second sensors 7A and 7B, which are respectively located in front of and behind the central axis C, form a first sensor pair. The third and fourth sensors 7C and 7D are spaced from each other by an angular distance of 180 degrees around the central axis C. The third and fourth sensors 7C and 7D, which are respectively located above and below the central axis C, form a second sensor pair. The first and third sensors 7A and 7C are spaced from each other by an angular distance of 90 degrees around the central axis C.

The sensor 7 is a magnetic sensor using magnetoresistive elements and functions not only as a displacement sensor but also as a rotary sensor. The sensor 7 includes a phase A magnetoresistive element and a phase B magnetoresistive element. Each of the phase A magnetoresistive element and the phase B magnetoresistive element detects a change in magnetic field caused by movement of the sensor rotor 17 located facing the sensor 7. According to the embodiment, as already described, the sensor rotor 17 has a gear shape. The teeth on the outer circumference of the sensor rotor 17 are subjected to detection by the sensor 7. The magnetic field at the sensor 7 changes as the sensor rotor 17 rotates about the central axis C. On the basis of the change in the magnetic field, the sensor 7 outputs, as detection signals, two waveform signals having a phase difference therebetween, namely, a phase A signal and a phase B signal.

The output signals of the sensor 7 are described in detail below. As described above, the sensor rotor 17 has a gear shape. Thus, the sensor 7 repeatedly outputs waveform signals with one period that is defined by the distance between circumferentially adjacent two of the teeth of the sensor rotor 17 (across a recess between the adjacent two teeth). It is assumed here that the total number of teeth of the sensor rotor 17 is "N", where N is a positive integer. During one rotation (i.e., 360 degree rotation) of the hub shaft 11 together with the sensor rotor 17, each of the sensors 7 outputs the waveform signal with one period repeatedly N times. In other words, during one rotation of the hub shaft 11 rotating together with the sensor rotor 17, each of the sensors 7 outputs a the periodic waveform signals a plurality of times.

As already described, each of the sensors 7 outputs two periodic waveform signals (i.e., phase A and phase B signals) having a phase difference therebetween. Specifically, in response to the rotational movement of the sensor rotor 17 located facing the sensor 7, the phase A magnetoresistive element outputs a sine signal while the phase B magnetoresistive element outputs a cosine signal. During one rotation (i.e., 360 degree rotation) of the hub shaft 11, each of the sensors 7 outputs the sine signal with one period repeatedly N times while outputting the cosine signal with one period repeatedly N times. As described later, the sine signal and the cosine signal are used to calculate the displacement and rotation angle of the hub shaft 11 rotating together with the sensor rotor 17. The processing device 18 (refer to FIG. 1) performs various processes including calculating the displacement and the rotation angle. The processing device 18 is provided outside the rotary device 10. According to the embodiment, the processing device 18 is structured by part of the functions of an electronic control unit (ECU) of the vehicle. The processing device 18 obtains the waveform signals of two phases from each of the plurality of (four) sensors 7 and performs various processes.

The sensor rotor 17 is not limited to a gear shape. For example, the sensor rotor 17 may be made of magnet and have circumferentially alternating north (N) and south (S) poles. The N poles (S poles) are equally spaced. In this case, each of the sensors 7 repeatedly outputs waveform signals with one period that is defined by the distance between adjacent two N poles across one S pole. The sensor 7 may have any other structure that outputs two periodic waveform signals having a phase difference therebetween in response to rotation of the sensor rotor 17. That is, the sensor 7 is not limited to a magnetoresisitve (MR) sensor and may be, for example, a Hall effect sensor. As another example, the sensor 7 may be an optical sensor such as a transmissive photoelectric sensor or a reflective photoelectric sensor. If the structure of the sensor 7 is changed, the structure of the sensor rotor 17 needs to be changed accordingly.

Regarding Sensor Signal Processing

Figure 5:
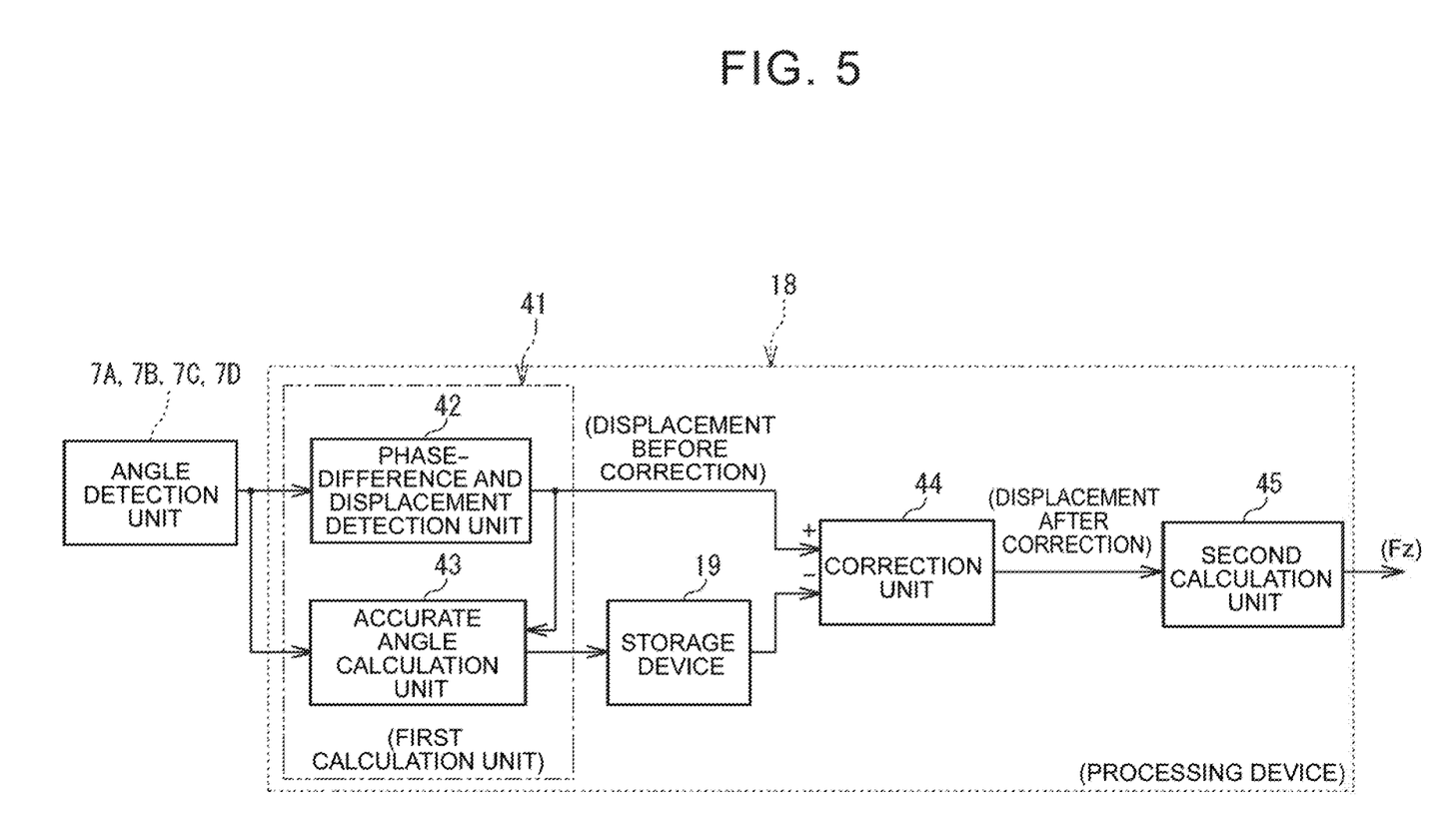
FIG. 5 is a flow diagram explaining processes performed by a processing device.

The following is a description of how the waveform signals output from the sensors 7 are processed. The processes described below are performed by the processing device 18. FIG. 5 is a flow diagram explaining the processes performed by the processing device 18. As already described, the rotary device 10 (refer to FIG. 1) includes the storage device 19 in addition to the processing device 18. The storage device 19 may be a computer memory or the like included in the processing device 18. Alternatively, the storage device 19 may be provided outside the processing device 18. The processing device 18 includes a processor and a storage device having a computer program stored therein. The storage device in the processing device 18 is a computer memory or the like and may be the storage device 19. The computer program causes, when executed by the processor, the processing device 18 to function as a first calculation unit 41, a correction unit 44, and a second calculation unit 45. The first calculation unit 41 includes a phase-difference and displacement detection unit 42 and an accurate angle calculation unit 43. The four sensors 7A, 7B, 7C, and 7D (refer to FIG. 2), which are respectively located in front of, behind, above, and below the central axis C, are examples of an angle detection unit illustrated in FIG. 5.

It is assumed here that due to unavoidable manufacturing errors in the rotary device 10, a slight whirling of the hub shaft 11 relative to the outer ring 12 occurs. The whirling of the hub shaft 11 appears as periodic fluctuations in the output signals of the sensor 7. The periodic fluctuations are unnecessary components of the waveform signals output from the sensor 7. The unnecessary components are hereinafter sometimes referred to as "rotational fluctuation components". That is, the waveform signals obtained from the sensor device 6 include the rotational fluctuation components. When a load acts on the hub shaft 11, if the processing device 18 calculates a load acting on the rotary device 10 based on the waveform signals without correcting the waveform signals, the calculated load may be inaccurate. For this reason, a correction process is performed. An example of the correction process is described below.

Figure 3:
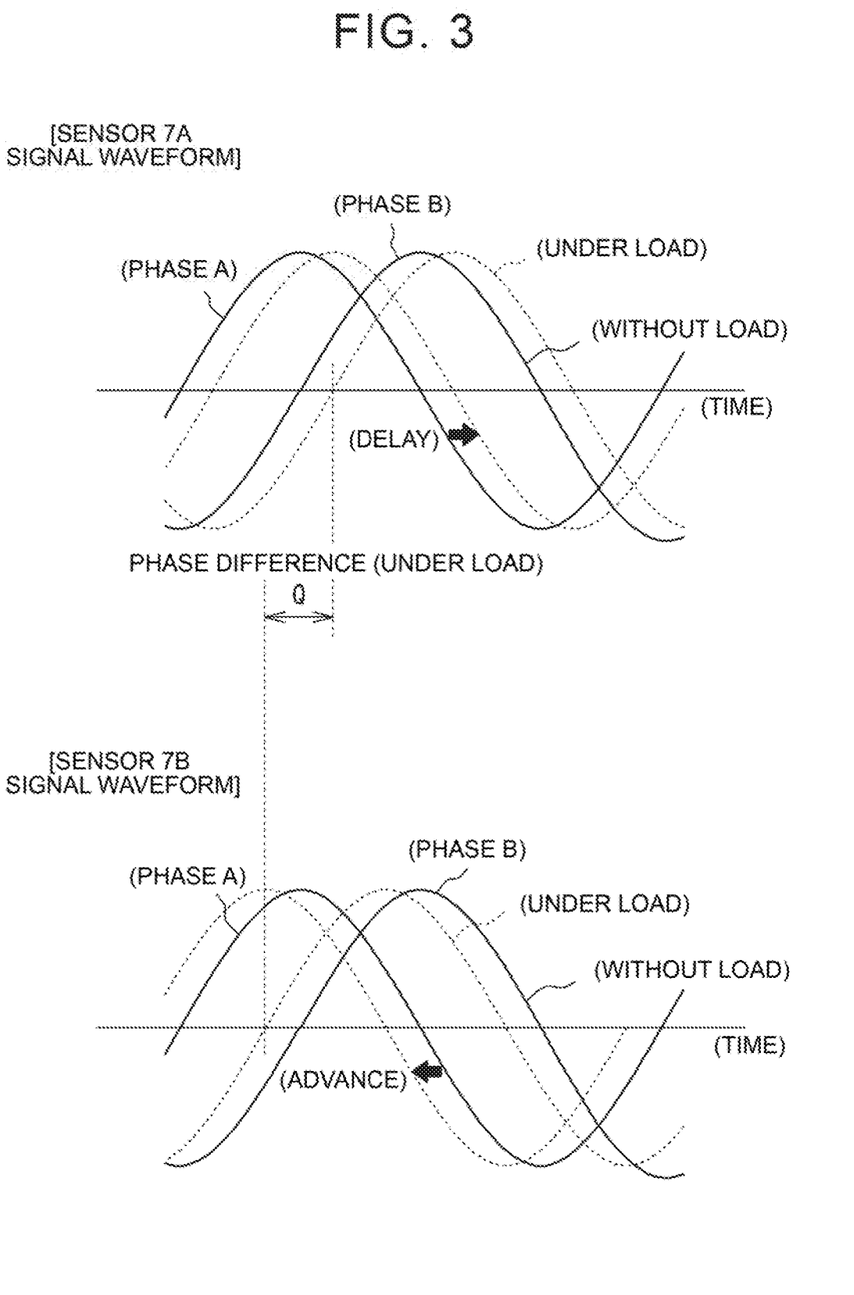
FIG. 3 is a diagram explaining waveform signals output from sensors.

It is assumed here that a load acts on the hub shaft 11 (refer to FIG. 1 and FIG. 2) downward in the Z-axis direction while the hub shaft 11 is rotating at a constant (angular) velocity. In this case, the hub shaft 11 and the sensor rotor 17 are slightly displaced together downward in the Z-axis direction, relative to the outer ring 12. This displacement is considered to be equivalent to rotational movement of the outer circumferential surface of the sensor rotor 17. In FIG. 2, an arrow R represents the direction of rotation of the hub shaft 11 and the sensor rotor 17. At the sensor 7A, the direction in which the hub shaft 11 and the sensor rotor 17 are displaced by the acting load is opposite to the direction of rotation of the hub shaft 11 (i.e., opposite to the direction of a tangent to the locus of rotation). For this reason, as illustrated in the upper part of FIG. 3, two waveform signals, i.e., A-phase and B-phase signals output from the sensor 7A are both delayed in phase relative to when no load acts. Thus, the displacement of the sensor rotor 17 is detected as a delay angle by the sensor 7A. In FIG. 3, the output signals of the sensor 7A before a load acts on the hub shaft 11 are indicated by continuous lines, and the output signals of the sensor 7A after a load acts on the hub shaft 11 are indicated by dashed lines. In contrast, at the sensor 7B, the direction in which the hub shaft 11 and the sensor rotor 17 are displaced by the acting load is the same as the direction of rotation of the hub shaft 11 (i.e., the same as the direction of a tangent to the locus of rotation), as can be seen from FIG. 2. For this reason, as illustrated in the lower part of FIG. 3, two waveform signals, i.e., A-phase and B-phase signals output from the sensor 7B are both advanced in phase relative to when no load acts. Thus, the displacement of the sensor rotor 17 is detected as an advance angle by the sensor 7B. In summary, when the hub shaft 11 is displaced relative to the outer ring 12 in one direction along the radial direction (in this embodiment, downward in the Z-axis direction), the sensor 7A outputs waveform signals delayed in phase while the sensor 7B outputs waveform signals advanced in phase.

In contrast, when a load acts on the hub shaft 11 upward in the Z-axis direction, the displacement of the sensor rotor 17 is detected as an advance angle by the sensor 7A and is detected as a delay angle by the sensor 7B. Further, as already described, the waveform signals output from the sensors 7 include the unnecessary rotational fluctuation component signals, in addition to load components.

The first and second sensors 7A and 7B are spaced from each other by an angular distance of 180 degrees around the central axis C and form a first sensor pair. When a load acts on the hub shaft 11, output signals of the paired sensors 7A and 7B have a phase difference Q (refer to FIG. 3). The phase difference Q is obtained as a difference in time between waveforms of the respective signals. To detect the (instantaneous) phase difference Q at a certain point in time, the waveform signals obtained from the sensors 7A and 7B are subjected to an angle conversion process. The angle conversion process is performed by the phase-difference and displacement detection unit 42 (refer to FIG. 5).

Figure 4:
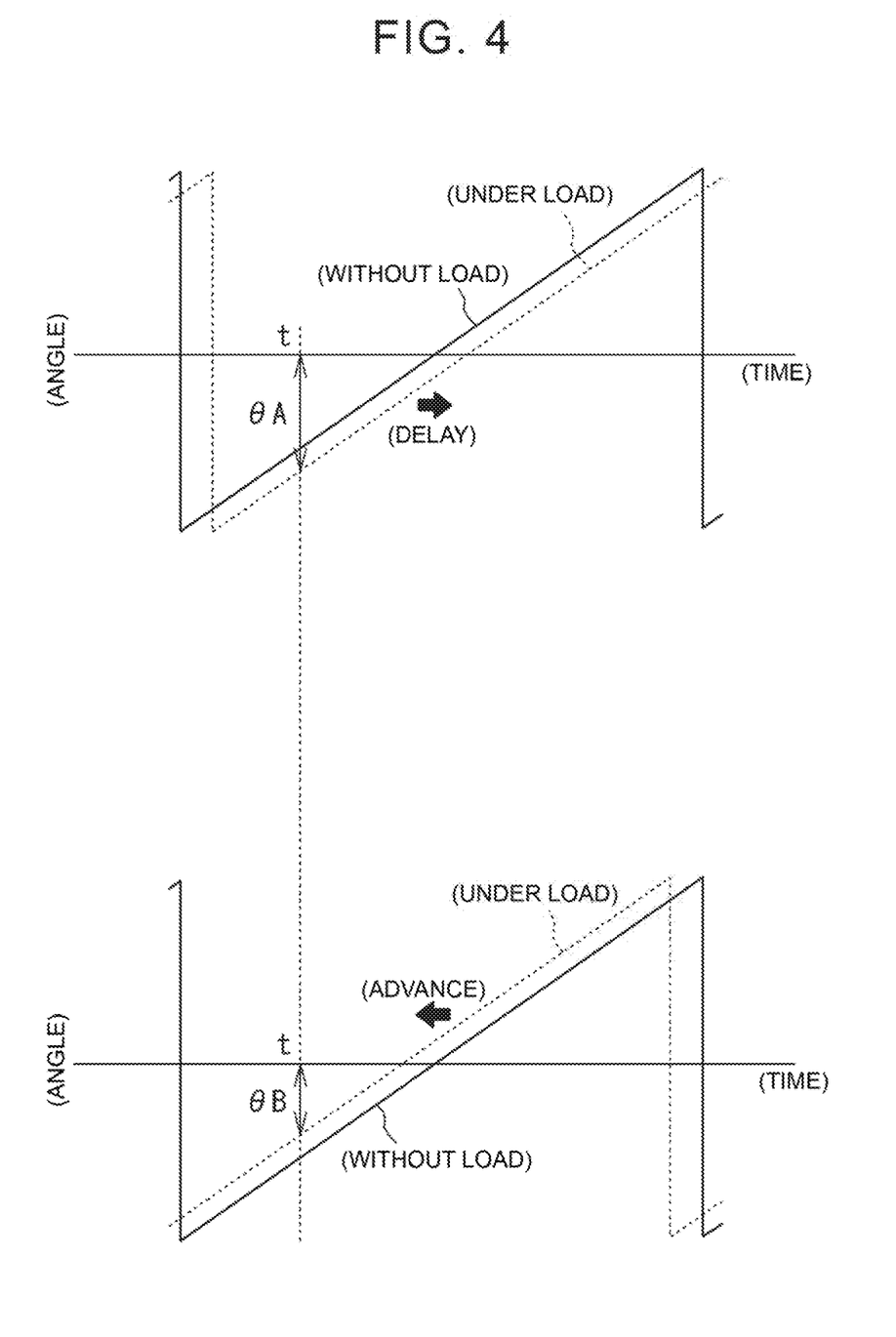
FIG. 4 is a diagram explaining angle signals obtained by converting the waveform signals.

The angle conversion process is described below. The angle conversion process performs predetermined computation (e.g., arctangent operation) on waveform signals obtained from the sensor 7A to convert the waveform signals into an angle signal (an electrical angle signal) that has monotonicity for each period of the corresponding waveform signal, as illustrated in FIG. 4. Likewise, the angle conversion process performs the predetermined computation on waveform signals obtained from the sensor 7B to convert the waveform signals into such an angle signal. The angle signal is an electrical angle signal (in units of radians). The "monotonicity" means that a signal monotonously increases or decreases without having a local maximum or minimum during each period of the signal. According to the embodiment, the angle signal is a triangle wave signal having monotonicity. The upper part of FIG. 4 illustrates a graph of the angle signal derived from the sensor 7A, and the lower part of FIG. 4 illustrates a graph of the angle signal derived from the sensor 7B. In each graph of FIG. 4, the vertical axis represents the rotation angle of the sensor rotor 17 (electrical angle in units of radians) at a detection target position for a corresponding one of the sensors 7A and 7B.

On the basis of the angle signals (rotation angles) obtained by the angle conversion process of the waveform signals from the sensor device 6, as illustrated in FIG. 4, a rotation angle (an electrical angle) $\theta A$ of the sensor rotor 17 at a detection target position for the sensor 7A at a certain point t in time is calculated, and a rotation angle (an electrical angle) $\theta B$ of the sensor rotor 17 at a detection target position for the sensor 7B at the certain point t in time is calculated.

Further, a rotation angle difference $\theta AB$ between the rotation angle $\theta A$ of the sensor rotor 17 at the detection target position for the sensor 7A and the rotation angle $\theta B$ of the sensor rotor 17 at the detection target position for the sensor 7B at the certain point t in time (i.e., at the same point in time) is calculated as follows: $\theta AB = \theta A - \theta B$. According to the embodiment, the rotation angles $\theta A$ and $\theta B$ are electrical angles in units of radians, and therefore, the rotation angle difference $\theta AB$ is calculated as an electrical angle difference in units of radians.

A displacement $\Delta Z$ of the hub shaft 11 (the sensor rotor 17) is in proportion to the electrical angle difference $\theta AB$ between the electrical angle $\theta A$ and the electrical angle $\theta B$. Thus, the displacement $\Delta Z$ of the hub shaft 11 caused by the load acting on the hub shaft 11 is calculable from the electrical angle difference $\theta AB$ using an equation (1) described below. That is, the displacement $\Delta Z$ and the electrical angle difference $\theta AB$ satisfy the relationship represented by the equation (1). In the equation (1), "r" represents the distance (a design value) from the center of rotation of the hub shaft 11 (i.e., the central axis C) to the outer circumference (of the teeth) of the sensor rotor 17. That is, "r" represents the radius of an imaginary circle passing through the outer circumference of the sensor rotor 17. The distance "r" is given in units of millimeters (mm). In the equation (1), "N" represents the total number of evenly spaced teeth (the subject of detection) of the sensor rotor 17. The calculation of the displacement $\Delta Z$ using the equation (1) is performed by the phase-difference and displacement detection unit 42 (refer to FIG. 5).

$$\Delta Z = 2 \times r \times \theta AB/N [mm] \quad (1).$$

In this way, the waveform signals output from the sensor device 6 are used to calculate the displacement $\Delta Z$ of the hub shaft 11 (the sensor rotor 17). Thus, the sensor device 6 is capable of functioning as a displacement sensor for obtaining the displacement $\Delta Z$ of the hub shaft 11.

After the displacement $\Delta Z$ is calculated, the calculated displacement $\Delta Z$ is converted to a value Fz of the load acting on the hub shaft 11 using an equation (2) described below. That is, the load value Fz is calculated by multiplying the displacement $\Delta Z$ by a bearing stiffness Kz in units of Newtons per millimeter (N/mm). The calculation of the load value Fz using the equation (2) is performed by the second calculation unit 45 (refer to FIG. 5).

$$Fz = Kz \times \Delta Z [N] \quad (2)$$

As described above, the embodiment assumes that a slight whirling of the hub shaft 11 relative to the outer ring 12 occurs. The whirling of the hub shaft 11 appears as periodic fluctuations in the output signals of the sensors 7A and 7B. That is, the waveform signals obtained from the sensors 7A and 7B include unnecessary rotational fluctuation component signals. As a result, the calculated displacement $\Delta Z$ includes the unnecessary rotational fluctuation component signals. For this reason, according to the embodiment, before calculation of the load value Fz, the correction unit 44 (refer to FIG. 5) performs a correction process that eliminates the unnecessary rotational fluctuation component signals. The displacement $\Delta Z$ is corrected to a displacement $\Delta Z'$ through the correction process, and the load value Fz is calculated based on the displacement $\Delta Z'$ using the equation (2) above.

Regarding Correction Process

The correction process performed by the processing device 18 (the correction unit 44) is described in FIG. 5. The storage device 19 has correction data stored therein. To cause the processing device 18 to perform the correction process, the correction data is precreated for the rotary device (a hub unit) 10 and is prestored in the storage device 19 for the rotary device (a hub unit) 10.

The following is a description of how the correction data is created. The hub shaft 11 is rotated without any load on the rotary device 10 (refer to FIG. 1). The processing device 18 receives waveform signals obtained from each of the sensors 7, with the hub shaft 11 being rotated under this condition. Another processing device (a processing device other than an ECU of the vehicle) may be used as the processing device 18 to create the correction data. When the hub shaft 11 rotates with a whirling motion that produces rotational fluctuation components, the distance between each sensor 7 and the sensor rotor 17 varies. For this reason, the waveform signals output from the sensors 7 include the rotational fluctuation components, but does not include load components.

Thus, the signals obtained from each of the sensors 7 have waveforms like those indicated by the continuous lines in FIG. 3. As already described, the continuous lines indicate waveform signals under no load conditions. The phase-difference and displacement detection unit 42 (refer to FIG. 5) receives, as input data, the waveform signals from the sensors 7 and performs the angle conversion process of the input data. As a result, as illustrated in FIG. 4, the waveform signals from the sensors 7 are converted into angle signals $\theta$ that have monotonicity for each period of the corresponding waveform signal. The angle signal $\theta$ is expressed by an electrical angle in units of radians.

The accurate angle calculation unit 43 continuously obtains a count number k that is the number of rotor teeth (the subject of detection) counted from a start position from which one rotation of the hub shaft 11 starts. For example, when the total number N of rotor teeth is "30", the count number k becomes "15" upon half rotation (180 degree rotation) of the hub shaft 11. The count number k is obtained from the number of periods of the waveform signals from the sensor 7.

A rotation angle $\alpha$ of the hub shaft 11 from the start position at a certain point in time during one rotation is calculated using an equation (3) described below from the angle signal $\theta$ (in units of radians) at the certain point in time obtained by the angle conversion process, the total number N of rotor teeth (the subject of detection), and the count number k at the certain point in time. The rotation angle $\alpha$ is a mechanical angle in units of degrees. The angle signal $\theta$ used to calculate the rotation angle $\alpha$ may be the value derived from one of the four sensors 7 or may be the average of the values derived from some or all of the four sensors 7. According to the embodiment, the angle signal $\theta$ used to calculate the rotation angle $\alpha$ is the average of the values derived from the paired sensors 7 (e.g., the sensors 7A and 7B) that are spaced from each other by an angular distance of 180 degrees.

$$\alpha = k \times (360 \text{ degrees}/N) + \theta/N \quad (3).$$

In this way, using the above equation (3), the rotational angle $\alpha$ of the hub shaft 11 from the start of rotation (from the start position) at a certain point in time during one rotation is calculated as a mechanical angle in the range of zero to 360 degrees ($0 \leq \alpha \leq 360°$).

Further, a whirling amount G (in units of millimeters) that is the amount of a whirling motion of the hub shaft 11 at a certain angle during one rotation from the start of rotation (from the start position) is calculated using an equation (4) described below. This calculation is performed by the phase-difference and displacement detection unit 42 and the accurate angle calculation unit 43 at the same point in time using the same sensor 7, and the calculated value is stored. Thus, this calculation is not affected by timing errors or systematic errors due to an external meter (an angle sensor).

$$G = G(\Delta Z(\theta AB, \alpha)) \quad (4).$$

The rotation angle difference $\theta AB$ (in units of radians) in the equation (4) is a value at the certain point in time and is calculated by the phase-difference and displacement detection unit 42 in the same manner as described above based on the waveform signals obtained from the sensor device 6 without any load on the rotary device 10 (refer to FIG. 1). The whirling motion of the hub shaft 11 causes a whirling motion of the sensor rotor 17 rotating together with the hub shaft 11. Therefore, even when no load acts on the rotary device 10, a difference ($\theta AB$) occurs between the rotation angle (electrical angle) $\theta A$ detected at the sensor 7A and the rotation angle (electrical angle) $\theta B$ detected at the sensor 7B.

Figure 6:
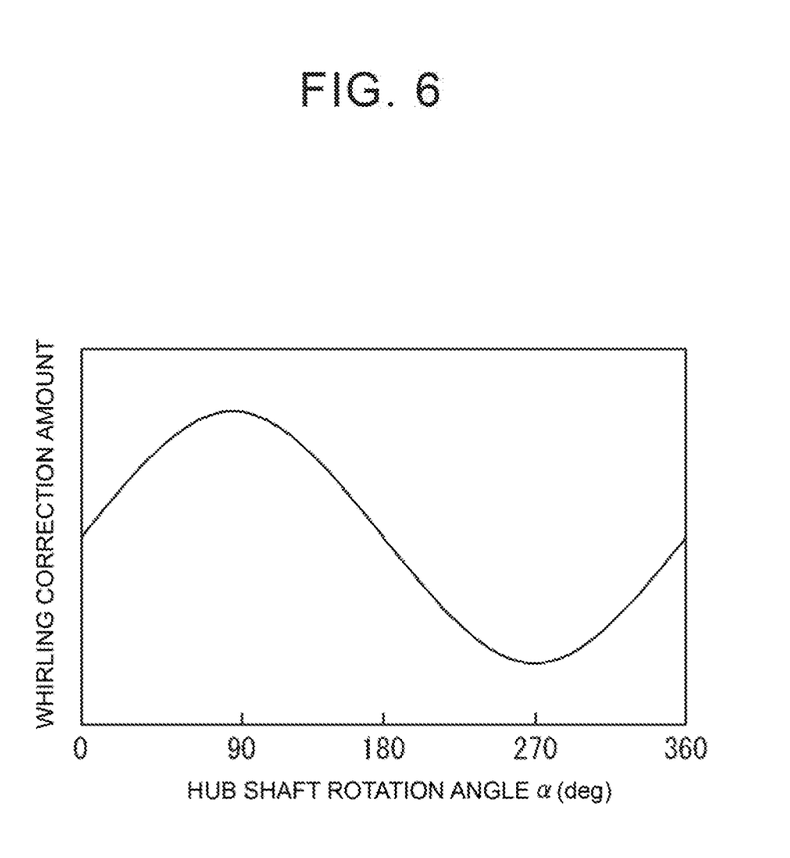
FIG. 6 is a diagram illustrating an example of correction data.

Thus, data indicating the whirling amount G at each rotation angle $\alpha$ (mechanical angle in units of degrees) of the hub shaft 11 during one rotation of the hub shaft 11 is created, as illustrated in FIG. 6. That is, this data indicates the whirling amount G during one rotation of the hub shaft 11 (from zero to 360 degrees of the rotation angle $\alpha$). Thus, the data illustrated in FIG. 6 is used as correction data indicating the relationship between the whirling amount G and the rotation angle α of the hub shaft 11 during one rotation of the hub shaft 11.

According to the embodiment, the correction data is provided in the form of a graph as illustrated in FIG. 6. Alternatively, the correction data may be provided in any other form including, for example, a table that maps the rotation angle α (mechanical angle) to the whirling amount G. The correction data is stored in the storage device 19 for the rotary device 10 used to create the correction data. That is, the correction data is individually created for each rotary device 10.

Figure 7:
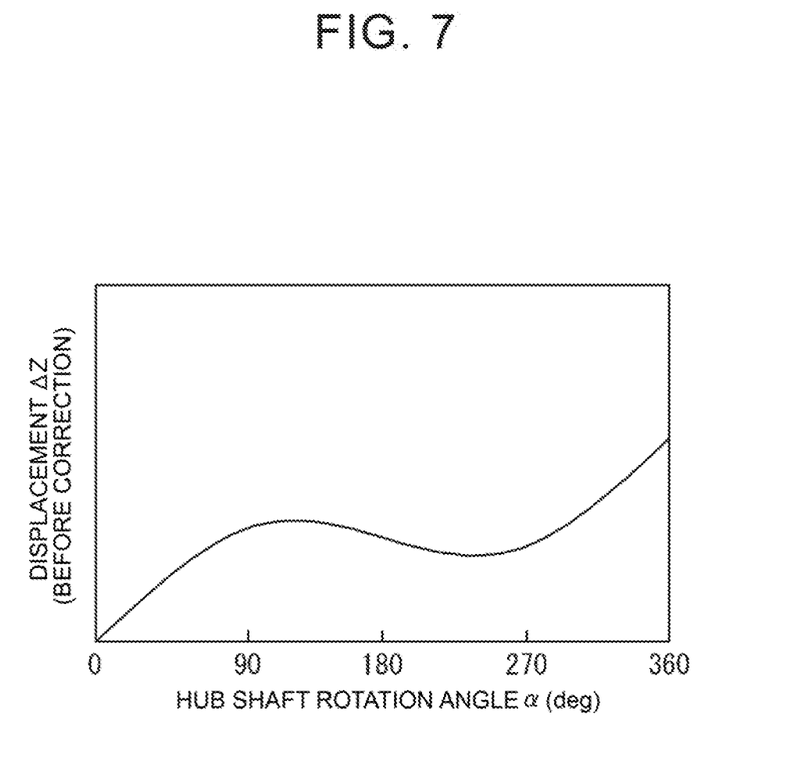
FIG. 7 is a graph illustrating the displacement of a hub shaft before correction.

Next, details of the correction process are described. FIG. 7 is a graph of the displacement ΔZ of the hub shaft 11 calculated, using the equation (1), based on waveform signals obtained from the sensors 7 during one rotation of the rotary device 10 rotating with a whirling motion under (monotonously) increasing load. That is, the graph of FIG. 7 illustrates the displacement ΔZ of the hub shaft 11 before correction.

Figure 8:
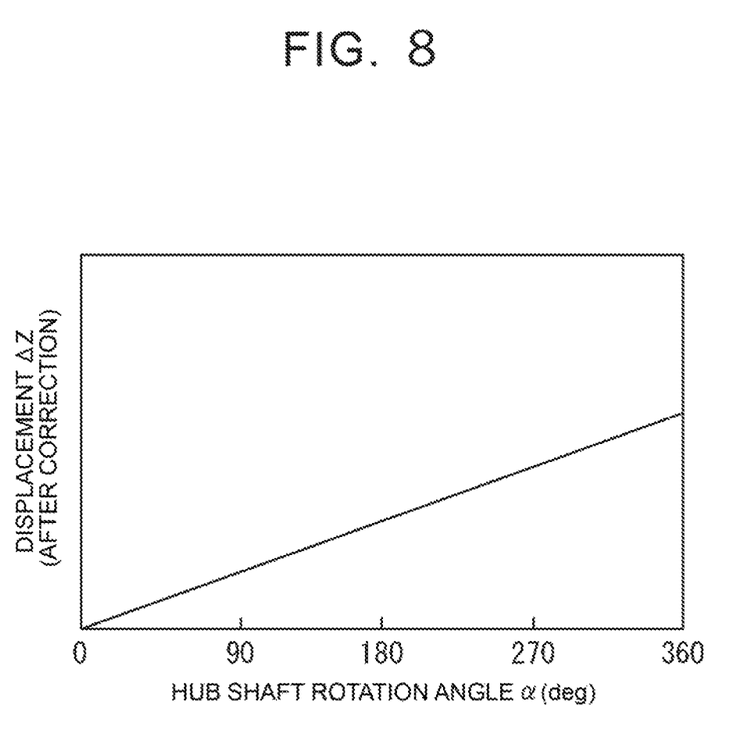
FIG. 8 is a graph illustrating the displacement of the hub shaft after correction.

In the correction process, the correction unit 44 of the processing device 18 subtracts the whirling amount G of the correction data (refer to FIG. 6) from the displacement ΔZ illustrated in FIG. 7 for each rotation angle α (mechanical angle). The result of this subtraction provides the displacement ΔZ' after correction, as illustrated in FIG. 8. Thus, the displacement ΔZ' illustrated in FIG. 8 does not include the unnecessary rotational fluctuation components.

On the basis of the displacement ΔZ' after correction, the load acting on the rotary device 10 is calculated using the equation (2) described above. In this way, the correction unit 44 performs the correction process that corrects the displacement ΔZ to the displacement ΔZ'.

Regarding Variables and Constants

The variables and constants used in the above processes are summarized below. "ΔZ" is the displacement of the hub shaft 11 as a rotary member and has units of millimeters (mm). "θA" is the electrical angle of the sensor rotor 17 at a position facing the sensor 7A and is expressed as an electrical angle in units of radians (rad). "θB" is the angle of the sensor rotor 17 at a position facing the sensor 7B and is expressed as an electrical angle in units of radians (rad). "θAB" is the difference (angular phase difference) between the angle at the position facing the sensor 7A and the angle at the position facing the sensor 7B, and is expressed as an electrical angle in units of radians (rad). The term "electrical angle" is an imaginary angle where one period of a periodic waveform is defined as 360 degrees (2πradians). "Fz" is a load acting on the hub shaft 11 as a rotary member and has units of Newtons (N). "Kz" is a constant representing bearing stiffness in the Z-axis direction and has units of Newtons per millimeter (N/mm).

Regarding Rotary Device 10 according to Embodiment

As described above, according to the embodiment, the rotary device 10 includes the following: the outer ring 12; the hub shaft 11 that rotates about the central axis C of the outer ring 12; the sensor device 6; and the processing device 18. The sensor device 6 includes the following: the sensor rotor 17 that rotates together with the hub shaft 11; the sensor 7A and the sensor 7B that are provided on the the outer ring 12 side, and the sensor rotor 17 is subjected to detection by the sensors 7A and 7B. The processing device 18 is configured to process output signals of the sensor device 6.

The sensor device 6 outputs a plurality of periods of periodic waveform signals during one rotation of the hub shaft 11 rotating together with the sensor rotor 17. Further, in the sensor device 6, when the hub shaft 11 is displaced relative to the outer ring 12 in one direction, the waveform signal from the sensor 7A is delayed in phase while the waveform signal from the sensor 7B is advanced in phase.

The processing device 18 performs the following processes: calculating the displacement ΔZ of the sensor rotor 17 rotating together with the hub shaft 11 (a first process); correcting the calculated displacement ΔZ of the sensor rotor 17 (a correction process); and calculating a load acting on the rotary device 10 from the corrected displacement ΔZ' (a second process). In the first process, based on the waveform signals from the sensor device 6, the rotation angle of the sensor rotor 17 at the detection target position for the sensor 7A and the rotation angle of the sensor rotor 17 at the detection target position for the sensor 7B (refer to FIG. 4) are calculated. Further, the displacement ΔZ of the sensor rotor 17 is calculated based on the difference (θAB) between the calculated rotation angles (refer to the equation (1)).

Thus, in the rotary device 10, the rotation angle of the sensor rotor 17 (θA, θB, θAB) and the displacement ΔZ of the sensor rotor 17 are both calculable based on the waveform signals output from the sensor device 6. Thus, the sensor device 6 functions not only as a sensor (a displacement sensor) for obtaining the displacement ΔZ of the sensor rotor 17 but also as a rotation sensor for obtaining the rotation angle (θA, θB, θAB) of the sensor rotor 17. It is noted that since the sensor rotor 17 rotates together with the hub shaft 11, the rotation angle of the sensor rotor 17 is equal to that of the hub shaft 11, and the displacement of the sensor rotor 17 is equal to that of the hub shaft 11.

The related art requires, in addition to a displacement sensor used to obtain a displacement, a separate rotation sensor (an ABS sensor) used to correct the displacement. In contrast to the related art, the rotary device 10 according to the embodiment eliminates the need of such a separate rotation sensor. This leads to reduction in size and weight of the rotary device 10. Further, the ABS sensor of the related art is an angular velocity sensor using pulse signals and therefore has low resolution that may cause large errors depending on the condition of a vehicle. In particular, when the vehicle is traveling at low speeds, accelerating, or decelerating, the accuracy of the ABS sensor may decrease to a level insufficient to correct the displacement. In contrast, the sensor device 6 according to the embodiment is used as an angle sensor that utilizes a periodic angle (i.e., continuous data). Thus, the sensor device 6 has resolution and sensing accuracy high enough to correct the displacement.

In conclusion, in the rotary device 10 according to the embodiment, the displacement of the hub shaft 11 calculated is correctable based on the waveform signals from the sensor device 6, and a load acting on the hub shaft 11 is accurately calculable from the corrected displacement.

Further, the rotary device 10 according to the embodiment includes the storage device 19, and the correction data (refer to FIG. 6) indicating the whirling amount of the hub shaft 11 during one rotation of the hub shaft 11 is prestored in the storage device 19. The correction unit 44 of the processing device 18 subtracts the whirling amount in the correction data from the displacement ΔZ calculated by the first calculation unit 41, thereby obtaining the displacement ΔZ' after correction. Thus, for example, when the displacement of the hub shaft 11 is calculated for each rotation of the hub shaft 11 to calculate a load acting on the rotary device 10, this calculation method reduces the time required to correct the displacement.

Modification of Correction Process

As described above, according to the embodiment, the displacement of the sensor rotor 17 (the hub shaft 11) is obtained based on waveform signals from the sensor device 6 and then is corrected by the correction unit 44 using the correction data prestored in the storage device 19. However, the correction process performed by the correction unit 44 is not limited to using the correction data prestored in the storage device 19. One modification of the correction process is described below.

The rotation frequency of the sensor rotor 17 corresponds to the frequency of the whirling motion of the hub shaft 11. Using this relationship, the correction process may be performed as follows. As already described, the sensor device 6 functions as an angle sensor. Thus, the processing device 18 obtains the rotation frequency of the sensor rotor 17 based on waveform signals output from the sensor device 6. Further, the processing device 18 converts the waveform signals from the sensor device 6 to a frequency domain using fast Fourier transform (FFT). Then, frequency data is obtained by removing frequency components corresponding to the rotation frequency of the sensor rotor 17 from the frequency domain data obtained by converting the waveform signals. Next, the frequency data is reconverted back to time domain data using inverse FFT. Then, the second calculation unit 45 calculates the displacement of the sensor rotor 17 based on the time domain data.

As described above, according to the modification, the correction unit 44 removes the frequency components corresponding to the rotation frequency from frequency domain data obtained by converting the waveform signals output from the sensor device 6. Further, the correction unit 44 reconverts the frequency data without the frequency components back to time domain data. Then, the second calculation unit 45 calculates the displacement of the sensor rotor 17 based on the time domain data. This modification eliminates the need of prestoring correction data, like the one illustrated in FIG. 6, in the storage device 19.

Other Modifications

Although the embodiment assumes that the load acts in the Z-axis direction, when the load acts in the X-axis direction, the same process as described for when the load acts in the Z-axis direction is performed using output signals of the third and fourth sensors 7C and 7D. Thus, the displacement of the hub shaft 11 and the load acting on the rotary device 10 in the X-axis direction are detectable.

Although the embodiment illustrates that the rotary device 10 is a vehicle hub unit, the rotary device 10 may be a device other than a vehicle hub unit. Although the embodiment illustrates that the sensor rotor 17 is a separate piece from the hub shaft 11 as a rotary member, a portion of a rotary member may be structured to serve as a sensor rotor.

The embodiment disclosed above is to be considered in all respects as illustrative and not restrictive. The scope of the disclosure is defined by the claims, not the description of the embodiment, and includes all modifications that fall within the scope of the claims and the equivalents thereof.

What is claimed is:

1. A rotary device comprising:
a stationary member;
a rotary member configured to rotate about a central axis of the stationary member;
a sensor device including a sensor rotor, a first sensor, and a second sensor, the sensor rotor being configured to rotate together with the rotary member, the first sensor and the second sensor being provided on the stationary member-side, and the sensor rotor being subjected to detection by the first sensor and the second sensor; and
a processing device configured to process signals output from the sensor device, wherein
each of the first sensor and the second sensor of the sensor device is configured to output a periodic waveform signal a plurality of times while the rotary member makes one rotation together with the sensor rotor,
the first sensor is configured to output a waveform signal that is delayed in phase when the rotary member is displaced relative to the stationary member,
the second sensor is configured to output a waveform signal that is advanced in phase when the rotary member is displaced relative to the stationary member,
the processing device is configured to calculate, based on the waveform signals, a first rotation angle of the sensor rotor at a first detection target position for the first sensor and a second rotation angle of the sensor rotor at a second detection target position for the second sensor, and
the processing device is configured to calculate a displacement of the sensor rotor based on a difference between the first rotation angle and the second rotation angle, to correct the calculated displacement, and to calculate a load acting on the rotary device from the corrected displacement.

2. The rotary device according to claim 1, further comprising a storage device configured to store correction data indicating a whirling amount of the rotary member during one rotation of the rotary member,
wherein the processing device is configured to correct the calculated displacement by subtracting the whirling amount indicated by the correction data from the calculated displacement of the sensor rotor.

3. The rotary device according to claim 1, wherein
the processing device is configured to calculate a rotation frequency of the sensor rotor based on the waveform signals output from the sensor device, and
the processing device is configured to remove a frequency component of the rotation frequency from frequency domain data obtained by converting the waveform signals output from the sensor device into frequency domains, to reconvert the frequency domain data without the frequency component back to time domain data, and to calculate the displacement of the sensor rotor based on the time domain data obtained through the reconversion.

4. The rotary device according to claim 1, wherein
the processing device is configured to convert the waveform signals from the first sensor and the second sensor respectively to a first angle signal and a second angle signal each having monotonicity for each period of the corresponding waveform signal, and
the processing device is configured to calculate the first rotation angle and the second rotation angle of the sensor rotor respectively from the first angle signal and the second angle signal.

5. The rotary device according to claim 1, wherein
each of the first sensor and the second sensor is configured to output two waveform signals having a phase difference.

* * * * *